Sept. 26, 1950 W. L. CLARY 2,523,944
AUTOMATIC POWER TRANSMISSION
Filed July 20, 1945 5 Sheets-Sheet 1

Inventor
William Leo Clary
By Clarence A. O'Brien
and Harvey B. Jackson
Attorneys Sept. 26, 1950 W. L. CLARY 2,523,944
AUTOMATIC POWER TRANSMISSION
Filed July 20, 1945 5 Sheets-Sheet 2

Inventor
William Leo Clary

By *Clarence A. O'Brien and Harvey B. Jacobson*
Attorneys

Sept. 26, 1950 W. L. CLARY 2,523,944
AUTOMATIC POWER TRANSMISSION
Filed July 20, 1945 5 Sheets-Sheet 3
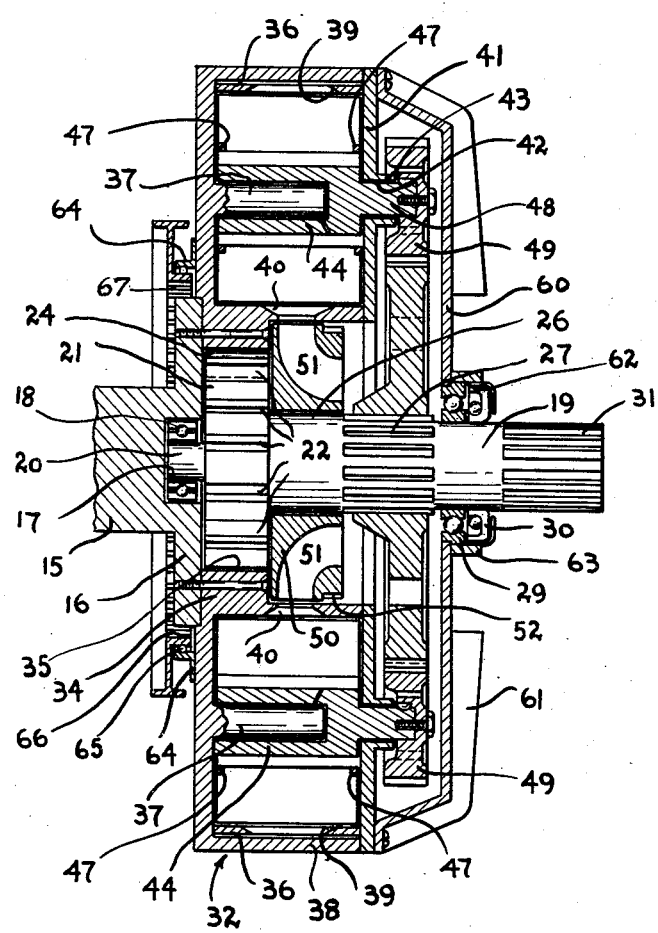
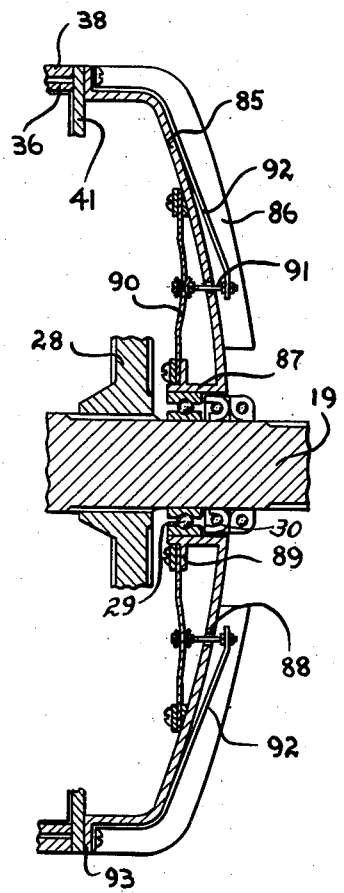
Inventor
William Leo Clary
By *Clarence A. O'Brien and Harvey B. Jacobson*
Attorneys

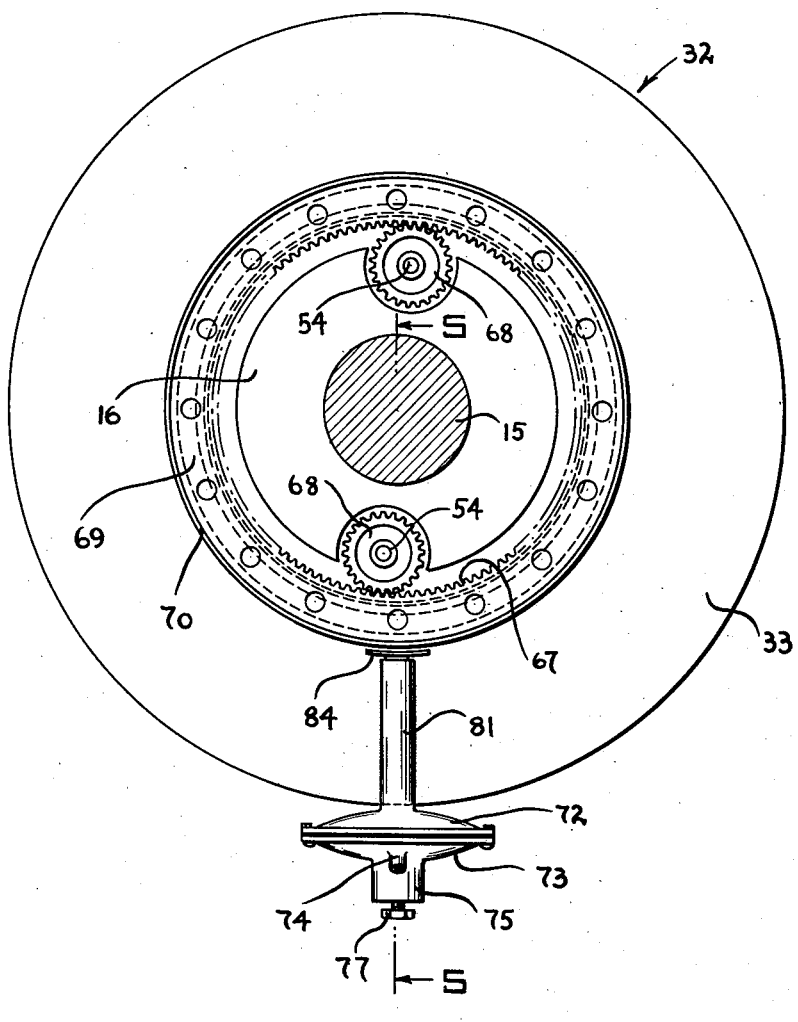

Sept. 26, 1950  W. L. CLARY  2,523,944
AUTOMATIC POWER TRANSMISSION
Filed July 20, 1945  5 Sheets-Sheet 5
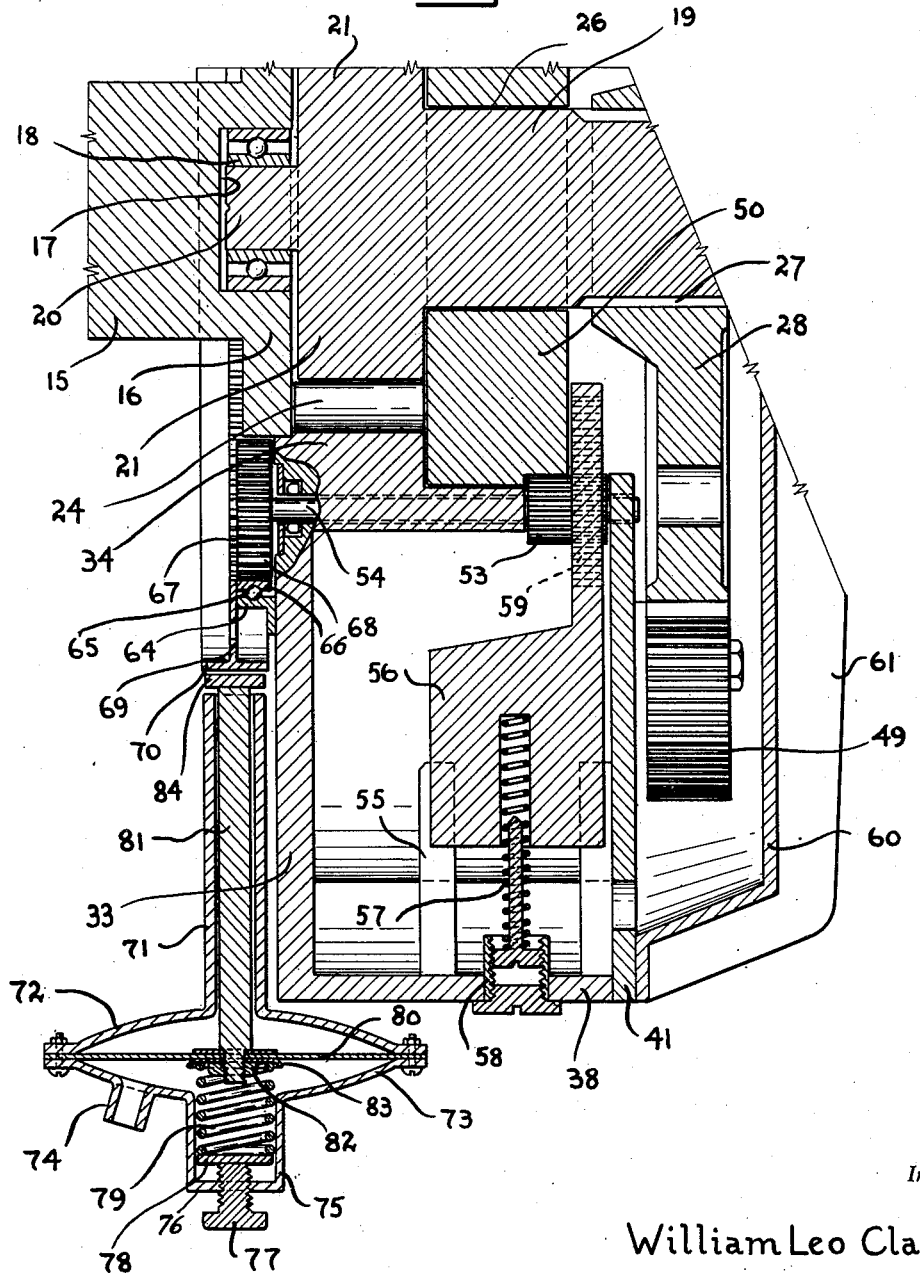
Inventor
William Leo Clary
By Clarence A. O'Brien
and Harvey B. Jacobson
Attorneys Patented Sept. 26, 1950

2,523,944

UNITED STATES PATENT OFFICE 2,523,944

AUTOMATIC POWER TRANSMISSION

William Leo Clary, Louisville, Ky., assignor of fifty-one per cent to Carrie M. Clary, Louisville, Ky.

Application July 20, 1945, Serial No. 606,081

8 Claims. (Cl. 74—752)

This invention relates to an automatic drive and more particularly to a drive adapted for use on vehicles driven by motors of the internal combustion type.

The object of the invention is to transmit power from a drive to a driven shaft and automatically to alter the speed at which the driven shaft rotates in direct proportion to the effort imposed upon the engine.

Another object is to effect a reduction of the speed at which the driven shaft rotates as the effort exerted by the engine increases and automatically to increase the speed of rotation of the driven shaft when the effort exerted by the engine is decreased.

Among its features my invention embodies a drive shaft carrying a spider, a driven shaft carrying a gear, pinions mounted on the spider to rotate about their own axes and to revolve in an orbit concentric with the gear, said pinions meshing with the gear and automatic fluid controlled means to retard or stop rotation of the pinions without effecting their orbital motion whereby the speed of rotation of the gear and drive shaft will be controlled.

Other features embody means connected with the engine to which the drive shaft is connected for controlling the movements of fluid controlled means in direct proportion to the effort exerted by the engine to drive the drive shaft and the mechanism driven thereby.

Still other features embody an over running clutch which automatically is thrown into operation when the effort exerted on the drive shaft exceeds the effort exerted by the engine whereby the engine may be employed as a braking means to retard the speed of rotation of the driven shaft.

In the drawings:

Figure 3 is a sectional view taken on the line 3—3 of Figure 1.

Figure 4 is a front view in elevation of Figure 1.

Figure 5 is a vertical sectional view on an enlarged scale taken on the line 5—5 of Figure 4, and Figure 6 is a sectional view similar to Figure 3 showing a modified form of cover plate.

Figure 1:
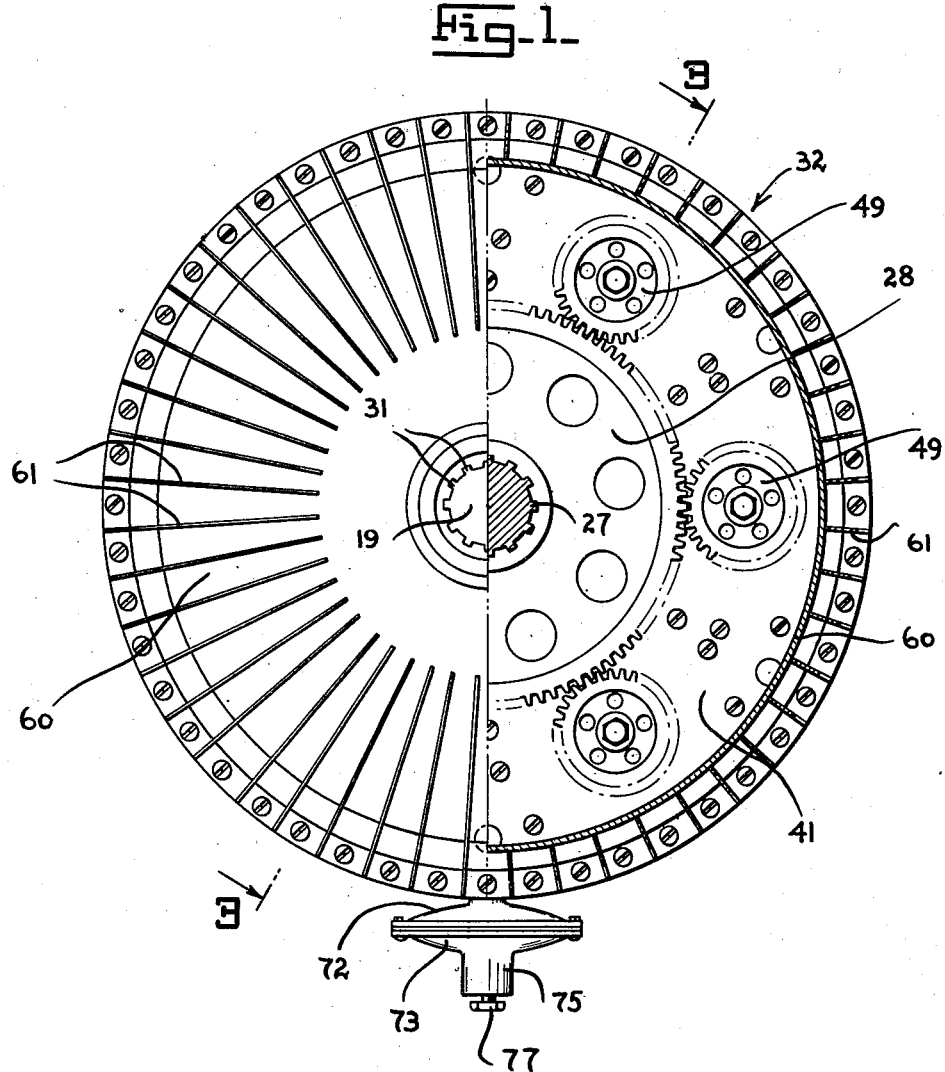
Figure 1 is a rear end view partly in section of an automatic transmission constructed in accordance with this invention.

Referring to the drawings in detail a drive shaft 15 is connected at one end to a source of power such as an internal combustion engine (not shown). This drive shaft carries at its opposite end a coupling flange 16 and is provided with an axial recess 17 into which the outer race of an anti-friction bearing 18 is fitted (Figure 3). It will be understood that the drive shaft 15 may constitute a continuation of the crank shaft of an engine.

Mounted for rotation in axial alignment with the drive shaft 15 is a driven shaft 19 carrying at one end a boss 20 which fits the inner race of the anti-friction bearing 18 so as to establish free rotation of the drive and driven shafts about the same axis. Formed on the shaft 19 adjacent the boss 20 is a flange 21 which carries at its periphery an annular series of teeth 22 (Figure 2) forming recesses 23 in which rollerss 24 are received. The bottom walls of these recesses are inclined tangentially away from the periphery of the flange 21 so that when a roller 24 is at one end of its recess it will be wholly within the recess while when it is at the other end its periphery will project outwardly beyond the outer ends of the teeth 22. Opening through the bottom wall of each recess 23 near its deepest end is a recess containing a compression coil spring 25 the outer end of which engages the roller 24 contained within the recess to urge the roller toward the opposite end of the recess. Formed on the shaft 19 adjacent the flange 21 is a smooth surface 26 (Figure 3) and fixed to the shaft as by splines 27 next to the smooth surface 26 is a gear 28. The shaft 19 is provided adjacent the splines 27 with a smooth surface upon which is fitted the inner race of an anti-friction bearing 29 and an oil seal 30 while that portion of the shaft which projects beyond the oil seal is provided with longitudinal grooves 31 forming splines to which a driven element may be attached.

Secured to the flange 16 of the drive shaft 15 is a housing designated generally 32. The front end wall 33 of this housing is provided with a central hub portion 34, the inner peripheral face 35 of which is adapted to fit closely around the outer edges of the teeth 22. Concentrically arranged around the outer periphery of the hub portion 34 is an annular series of cylindrical casings 36 and projecting into each casing from the end wall 33 is a stud 37 the axis of which is eccentric to the axis of its respective casing. A peripheral flange 38 extends rearwardly from the end wall 33 in the direction of the studs and each casing 36 is provided in its side facing the flange 38 with an inlet port 39 and diametrically opposite the inlet port is an outlet port 40. A ring-shaped cover 41 closes the rear end of each casing and is provided at spaced intervals with an opening 42 surrounded by a bearing collar 43. The openings 42 align axially with the studs 37 and the collars 43 cooperate with the studs 37 to form bearings for rotors 44 (Figure 2) which are of a diameter to just touch one side of their respective casings 36. Formed in each rotor are radial slots 45 in which vanes 46 are adapted to slide. Carried by the inner face of the wall 33 and the cover 41 in concentric relation to the casings 36 are guide rings 47 which engage the walls of notches formed at the innermost corners of the vanes 46 so that as the rotors 44 rotate about their axes the outer edges of the vanes will be maintained in constant contact with the inner peripheral faces of the casings 36. As shown in Figure 3 the rotors are provided with cylindrical bosses 48 which project through the collars 43 and carry at their outer ends pinions 49 which are in constant meshing engagement with the gear 28. It will thus be seen that as the housing 32 is rotated and the shaft 19 is held stationary the pinions will move in an orbit concentric with axis of the shaft 19 and at the same time the pinions will rotate about their own axes.

Figure 2:
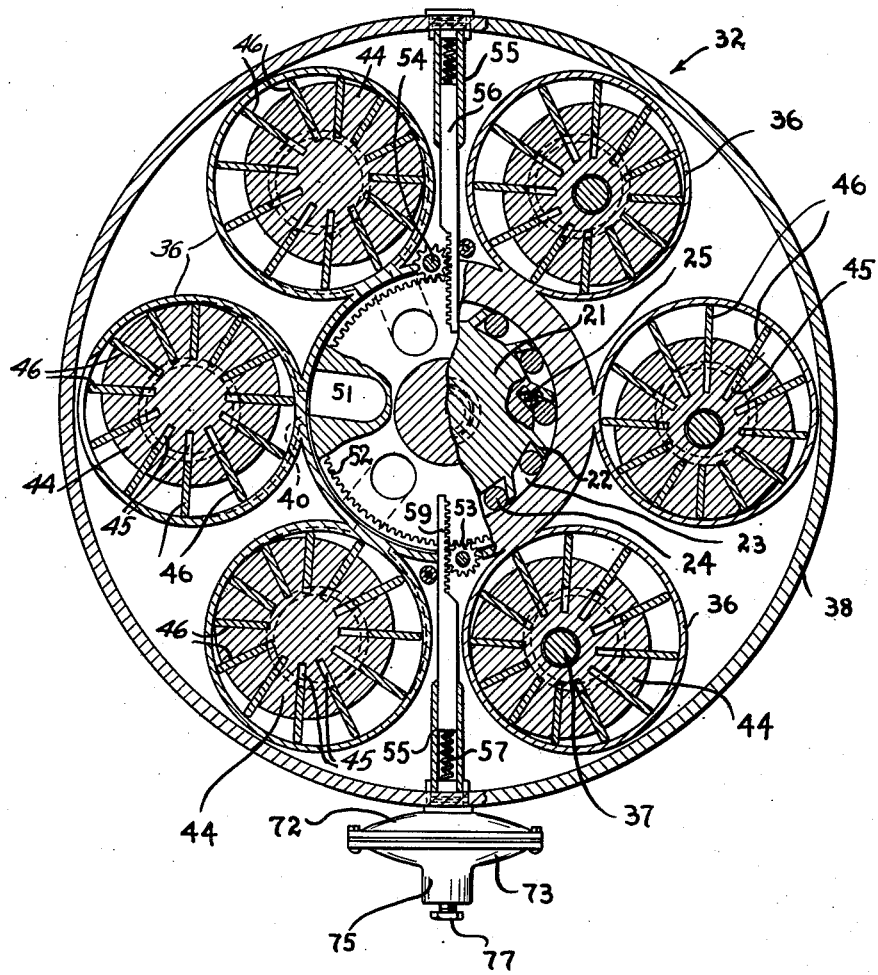
Figure 2 is a sectional view taken on two different planes through this transmission.

Mounted for rotation within the hub portion 34 is a ring shaped valve body 50. This valve body is provided at spaced intervals with L-shaped ports 51 one leg of each of which opens outwardly through the periphery of the body while opposite leg opens through the rear wall. It is to be understood that there is one port 51 for each outlet port 40 as illustrated in Figure 2. Formed at the rear end of the valve body is an annular series of teeth 52 which mesh with pinions 53 carried by shafts 54 which are mounted for rotation through the front wall of the casing at diametrically opposed points. Slidably mounted in radial guides 55 within the casing are fly weights 56 which are urged inwardly toward the center of the casing by compression springs 57. The outer ends of these springs are adjustably mounted as shown in Figure 5 in bushings 58 carried at diametrically opposite points in the flange 38 of the housing 32. Formed at the inner end of each fly weight 56 is a rack 59 which meshes with its respective pinion 53. It will thus be seen that as the fly weights 56 move outwardly under the centrifugal force exerted thereon by the rotation of the housing, the valve body 50 will be rotated in a direction to move the ports 51 out of alignment with the ports 40. As soon as the centrifugal force is reduced as by retarding the speed of rotation of the housing 38 the springs 57 will return the fly weights to their innermost position and thus restore the alignment of the ports 51 with the ports 40.

Enclosing the gear 28 and the pinions 49 and attached to the rear side of the housing 32 is a cover 60 carrying on its exterior radial heat radiating fins 61. Formed concentrically in the cover 60 is an opening 62 which is surrounded with an outwardly extending tubular boss 63 into which the outer race of the anti-friction bearing 29 and the oil seal 30 is fitted. The junction of the cover 60 and the housing is of such construction as to be fluid tight and the spaces within the housing 32 and the cover 60 are completely filled with a suitable non-compressible fluid such as oil.

Carried on the front wall 33 of the housing 32 and concentric with the shaft 16 is an annular flange 64 which serves as the outer race of an anti-friction bearing 65, the inner race of which comprises an annulus 66 the inner face of which is toothed to form an internal ring gear 67. A pinion 68 is carried by the outer end of each shaft 54 and meshes with the gear 67. Extending outwardly from the outer front edge of the annulus 66 is a peripheral flange 69 carrying at its periphery a flange or rim 70 which serves as a brake drum.

Mounted in any suitable manner (not shown) adjacent the front face of the wall 33 of the housing 32 is a tubular guide 71. This guide may be disposed in any convenient angular position about the axis of the shaft 15 but must extend radially with relation thereto. Carried at the extreme outer end of the guide 71 is a dished flange 72 adjacent the peripheral edge of which is secured an oppositely dished flange 73 carrying a tubular nipple 74 and an axial tubular socket 75 which is closed at its outer end by an end wall 76. A thumb screw 77 is threaded axially through the wall 76 and carries at its inner end a disk 78 upon which the outer end of a compression coil spring 79 is seated. Clamped between the meeting edges of the dished flanges 72 and 73 is a diaphragm 80 formed with a central aperture through which the threaded end of a push rod 81 is thrust. This rod is held in position in the diaphragm by a nut 82 which also serves to hold a spring seating washer 83 in place on the outer face of the diaphragm. As shown in Figure 5 the push rod 81 is slidable through the tubular guide 71 and carries at its inner end a brake shoe 84 which is disposed adjacent the flange 70 so that as the diaphragm 80 is flexed the shoe 84 will be moved into contact with the flange 70.

In Figure 6 there is shown a modified form of cover plate which comprises a dish shaped body 85 carrying near its periphery radial fins 86 and centrally thereof an opening surrounded by an inturned collar 87 in which the outer race of the antifriction bearing 29 and the oil seal 30 are adapted to be received in order to secure the shaft 19 and gear 28 in place in the cover. Formed in the body 85 is an annular row of spaced openings 88 and attached to a flange 89 carried near the inner end of the collar 87 is the inner edge of a ring shaped diaphragm 90 the outer edge of which is attached to the body 85 intermediate its inner and outer edges. Secured to the diaphragm 90 in alignment with and extending through each opening 88 is a plunger rod 91 the outer end of which is attached to a bi-metallic strip 92 the opposite end of each of which extends around the outer edge of the body 85 and is anchored to the attaching flange 93 thereof. It will thus be seen that as the body 85 becomes heated the bi-metalic strips 92 will expand and cause pull to be exerted on the rods 91 so as to cause the diaphragm 90 to move outwardly. In this manner any expansion of the fluid within the housing 32 and the cover will be accommodated and when the heating subsides and normal temperatures are again encountered, the strips 92 will return to original position and thus restore the diaphragm 90 to normal position to thereby compensate for the reduced volume of the fluid. In this manner any changes in volume of the fluid within the housing and the cover plate may be compensated for.

The operation of the valve body 50 under the influence of the centrifugal control has already been explained. The auxiliary control however, is governed by the effort being exerted by the engine to drive the load. This control is effected by coupling the nipple 74 to the intake manifold of the engine so that the diaphragm 80 will be caused to move as the vacuum conditions in the intake manifold change with the opening or closing of the throttle valve. Hence when the engine is operating under normal load and speed conditions the vacuum maintained in the manifold is sufficient to hold the diaphragm down against the tension of the spring 79. If however, it becomes necessary to open the throttle valve to a greater extent, as when the load is increased, the vacuum will be correspondingly decreased thus allowing the diaphragm 80 to flex under the influence of the spring 79 and thus push the rod 81 so that the shoe 84 contacts the rim 70. Arrest or retardation of the flange 70 which is normally revolving with the housing 36 causes the internal ring gear to also be arrested or retarded so that the gears 68 will be caused to rotate about their axes thus driving the shafts 54 and pinions 53 so as to move the valve 50 in such a direction as to tend to move the ports 51 and 40 to open position. Such action will allow a greater amount of fluid to flow through the pumps and hence reduce the speed ratio between the drive and driven shafts. Should the driven shaft tend to rotate faster than the drive shaft, the rollers 24 will move under the influence of the springs 25 outwardly through contact with the bottom walls of the recesses 23 to engage the inner peripheral face 35 of the hub 34, thus to establish positive driving connection between the driven and the drive shafts.

The vacuum control working in conjunction with the centrifugal control insures a smooth yet positive transition from one speed to another and in direct ratio to the effort being exerted by the engine.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A fluid drive including a drive shaft, a spider carried by the drive shaft, a driven shaft in axial alignment with the drive shaft, a gear carried by the driven shaft, pinions mounted on the spider to revolve in an orbit concentric with the axis of the drive and driven shafts and to rotate about their own axes, said pinions being continuously in mesh with the gear on the driven shaft, a fluid pump driven by each pinion, and a ring shaped valve mounted to rotate about the driven shaft to govern the discharge of fluid from the pumps, means yieldingly to urge the valve to open position and centrifugal means to move the valve to closed position as the speed of rotation of the spider increases.

2. A fluid drive including a drive shaft, a spider carried by the drive shaft, a driven shaft in axial alignment with the drive shaft, a gear carried by the driven shaft, pinions mounted on the spider to revolve in an orbit concentric with the axis of the drive and driven shafts and to rotate about their own axes, said pinions being continuously in mesh with the gear on the driven shaft, a fluid pump driven by each pinion, and a ring shaped valve mounted to rotate about the driven shaft to govern the discharge of fluid from the pumps, and centrifugal means to govern the opening and closing of the valve, and auxiliary means adapted under certain conditions to open the valve against the force of the centrifugal means.

3. A fluid drive including a drive shaft, a spider carried by the drive shaft, a driven shaft in axial alignment with the drive shaft, a gear carried by the driven shaft, pinions mounted on the spider to revolve in an orbit concentric with the axis of the drive and driven shafts and to rotate about their own axes, said pinions being continuously in mesh with the gear on the driven shaft, a fluid pump driven by each pinion, and a ring shaped valve mounted to rotate about the driven shaft to govern the discharge of fluid from the pumps, means yieldingly to urge the valve to open position, centrifugal means to move the valve to closed position as the speed of rotation of the spider increases, and auxiliary means adapted under certain conditions to open the valve against the force of the centrifugal means.

4. A fluid drive including a drive shaft, a spider carried by the drive shaft, a driven shaft in axial alignment with the drive shaft, a gear carried by the driven shaft, pinions mounted on the spider to revolve in an orbit concentric with the axis of the drive and driven shafts and to rotate about their own axes, said pinions being continuously in mesh with the gear on the driven shaft, a fluid pump driven by each pinion, a ring shaped valve mounted to rotate about the driven shaft to govern the discharge of fluid from the pumps, means yieldingly to urge the valve to open position, centrifugal means to move the valve to closed position as the speed of rotation of the spider increases, and vacuum actuated auxiliary means adapted under certain conditions to hold the valve against movement under the influence of the centrifugal means.

5. A fluid drive including a drive shaft, a spider carried by the drive shaft, a driven shaft in axial alignment with the drive shaft, a gear carried by the driven shaft, pinions mounted on the spider to revolve in an orbit concentric with the axis of the drive and driven shafts and to rotate about their own axes, said pinions being continuously in mesh with the gear on the driven shaft, a fluid pump driven by each pinion, a ring shaped valve encircling the driven shaft to govern the discharge of fluid from the pumps, means yieldingly to urge the valve to open position, centrifugal means to move the valve to closed position as the speed of rotation of the spider increases and vacuum actuated auxiliary means adapted when the effort imparted to the drive shaft increases to hold the valve against movement under the influence of the centrifugal means.

6. In a fluid drive a drive shaft, a driven shaft adjacent and in axial alignment with the drive shaft, an annular row of pump casings mounted to revolve with the drive shaft in an orbit about the driven shaft, each pump casing having a discharge port which opens toward the driven shaft, an impeller mounted to rotate in each pump casing, a drive pinion on each impeller, a drive gear fixed to the driven shaft and meshing with the drive pinions of the impellers, a ring shaped valve mounted to rotate about the driven shaft adjacent the annular row of pump casings, said ring shaped valve having peripheral ports therein which are adapted to move into and out of registry with the discharge ports in the pump casings, means yieldingly to hold the ports in the valve in registration with the ports in the pump casings, and centrifugal means to move the ports out of such registration as the speed of revolution of the pump casings increases.

7. In a fluid drive, a drive shaft, a driven shaft adjacent and in axial alignment with the drive shaft, an annular row of pump casings mounted to revolve with the drive shaft in an orbit about the driven shaft, each pump casing having a discharge port which opens toward the driven shaft, an impeller mounted to rotate in each pump casing, a drive pinion on each impeller, a drive gear fixed to the driven shaft and meshing with the drive pinions of the impellers, a ring shaped valve mounted to rotate about the driven shaft adjacent the annular row of pump casings, said ring shaped valve having peripheral ports therein which are adapted to move into and out of registry with the discharge ports in the pump casings, means yieldingly to hold the ports in the valve in registration with the ports in the pump casings, centrifugal means to move the ports out of such registration as the speed of revolution of the pump casings increases, and means to arrest movement of the valve under the influence of the centrifugal means as the driving effort imparted to the drive shaft is increased.

8. In a fluid drive a drive shaft, a driven shaft adjacent and in axial alignment with the drive shaft, an annular row of pump casings mounted to revolve with the drive shaft in an orbit about the driven shaft, each pump casing having a discharge port which opens toward the driven shaft, an impeller mounted to rotate in each pump casing, a driven pinion on each impeller, a drive gear fixed to the driven shaft and meshing with the drive pinions of the impellers, a ring shaped valve mounted to rotate about the driven shaft adjacent the annular row of pump casings, said ring shaped valve having peripheral ports therein which are adapted to move into and out of registry with the discharge ports in the pump casings, means yieldingly holding the ports in the valve in registration with the ports in the pump casings, centrifugal means to move the ports out of such registration as the speed of revolution of the pump casings increases, a brake drum coupled to the valve and movable therewith in an orbit concentric with the drive shaft, a brake shoe adapted yieldingly to engage the brake drum to arrest movement of the valve under the influence of the centrifugal means and pressure actuated means adjacent the brake drum for disengaging the brake shoe from the drum.

WILLIAM LEO CLARY.

REFERENCES CITED

The following references are of record in the file of this patent:

UNITED STATES PATENTS

| Number | Name | Date |
|---|---|---|
| 1,231,160 | Hungerford | June 26, 1917 |
| 1,249,660 | Olson | Dec. 11, 1917 |
| 1,956,893 | Carter | May 1, 1934 |
| 1,961,619 | McClain | June 5, 1934 |
| 2,019,849 | Foster | Nov. 5, 1935 |
| 2,063,117 | Ongaro | Dec. 8, 1936 |
| 2,066,450 | Bascle | Jan. 5, 1937 |
| 2,178,804 | Murphy | Nov. 7, 1939 |
| 2,196,585 | Gette | Apr. 9, 1940 |
| 2,197,165 | Webster | Apr. 16, 1940 |
| 2,209,949 | McCormack | Aug. 6, 1940 |
| 2,218,896 | Shultz | Oct. 22, 1940 |
| 2,238,748 | Patterson | Apr. 15, 1941 |
| 2,267,131 | Paulson | Dec. 23, 1941 |